(No Model.)

F. MOSSBERG.
ANTIFRICTION BEARING.

No. 486,052. Patented Nov. 8, 1892.

WITNESSES:
M. F. Bligh.
Chas. H. Luther Jr.

INVENTOR.
Frank Mossberg
BY
Joseph A. Miller & Co.
ATTORNEYS.

UNITED STATES PATENT OFFICE.

FRANK MOSSBERG, OF ATTLEBOROUGH, MASSACHUSETTS, ASSIGNOR TO THE MOSSBERG MANUFACTURING COMPANY, OF SAME PLACE.

ANTIFRICTION-BEARING.

SPECIFICATION forming part of Letters Patent No. 486,052, dated November 8, 1892.

Application filed December 1, 1891. Serial No. 413,659. (No model.)

*To all whom it may concern:*

Be it known that I, FRANK MOSSBERG, of Attleborough, in the county of Bristol and State of Massachusetts, have invented certain new and useful Improvements in Antifriction-Bearings; and I hereby declare that the following is a full, clear, and exact description of the same, reference being had to the accompanying drawings, forming part of this specification.

This invention relates to improvements in that class of antifriction-bearings known as "roller-bearings" and in the method of making the same.

The object of this invention is to produce a bearing in which the journaled portion of the shaft will be provided with antifriction-bearing surfaces extending the full length of said journaled portion.

The further object of this invention is to produce a roller-bearing in which the torsional strain exerted on the antifriction-rolls and the cage containing these rolls by the revolution of the shaft journaled therein will be reduced to a minimum.

The invention consists in the cage for holding the rolls in place and the novel combination therewith of rolls adapted to provide long bearings for the shaft, as will be more fully described hereinafter, and pointed out in the claim.

Figure 1:
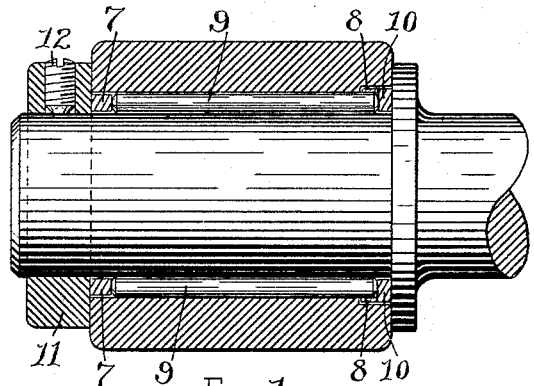
Figure 2:
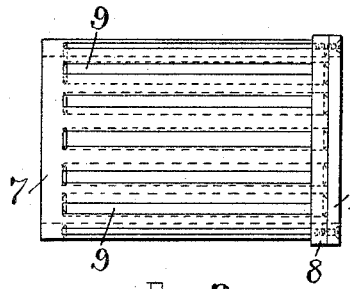
Figure 3:
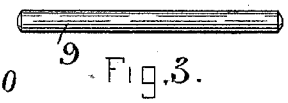
Figure 4:
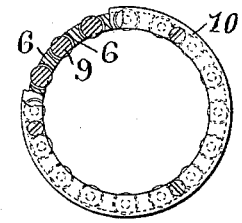
Figure 5:
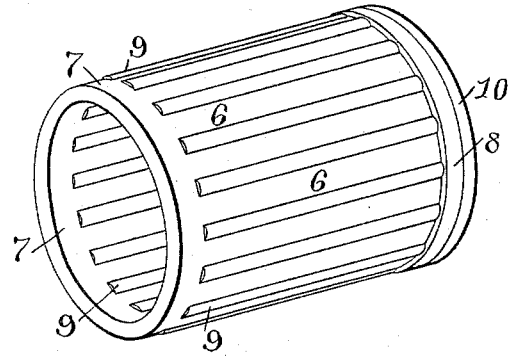

Figure 1 represents a horizontal sectional view of the improved roller-bearing, a shaft being shown as journaled therein. Fig. 2 represents a side view of the cage and the rolls contained therein removed from the shaft to more clearly indicate the construction of the same. Fig. 3 represents one of the rolls removed from the cage. Fig. 4 is an end view of the cage, partly in section, to show the manner in which the rolls are journaled therein. Fig. 5 is an enlarged perspective view of the complete cage and the rolls.

Similar numbers of reference designate corresponding parts throughout.

In carrying out my invention I take a sleeve formed of suitable metal and of any desired diameter, the material of the same being of considerable thickness, and, starting at one end, I bore a series of holes in the sleeve parallel with each other and extending nearly the length of the sleeve to form bearings, in which the antifriction-rolls are to be journaled. I now cut away the inner surface of the sleeve throughout the length of the same until the desired portion thereof is cut away. The outer surface of the sleeve is then turned away in a like proportion, except that at the end from which the holes were bored a strengthening-flange is left, which extends around the sleeve. By these means I have produced a circular cage consisting of the bars 6 6, the opposite edges of which are concaved, as is shown in Fig. 4, these bars 6 6 being connected at one end by the solid portion 7 and at the other end by the strengthening-flange 8. The rolls 9 9 are now prepared from round bars of metal of a size to easily fit and rotate within the bearing formed by the concaved surfaces of the bars 6 6, the ends of these rolls being rounded or slightly cone-shaped to avoid friction with the ends of the cage. The bearing-slots in the cage being filled with a like number of rolls, I secure the ring 10 over the open ends of said slots by bolting or screwing it to the flange 8, to which it corrresponds in size and shape. The bearing is now complete and can be shipped without danger of the rolls falling out. When it is to be placed in position in a journal-box, I cut away a portion of the inner surface of said box to admit the entrance therein of the flange 8 and the ring 10, as is shown in Fig. 1. The ring 10 may be omitted, however, and the inner ends of the rolls 9 9 allowed to bear against the collar on the shaft.

When in operation, those portions of the rolls extending beyond the outer surface of the cage will bear against the inner surface of the journal-box, while the portions of the rolls extending beyond the inner surface of said cage will bear against the journaled portion of the shaft, the end of which is generally surrounded with the collar 11, secured in place on the shaft by the set-screw 12.

It will be readily seen that the twisting or torsional strain either on the cage or on the rolls is greatly reduced by this device, the cage being free to revolve and the rolls to rotate in their bearings, in which they are held perfectly parallel to each other and to the line of the shaft, it being impossible for one end of a roll to move faster than the other end, which is usual in roller-bearings.

In practice it is found that a long bearing is essential for the successful operation of heavy machines. When a series of balls are used for the shaft to bear against, the journaled portion of the shaft is worn in circumferential grooves by the small contact-surfaces of the balls, which in a short time will greatly increase the friction and destroy the shaft. This is especially the case from the difficulty experienced in producing perfectly-spherical balls of hardened metal. My invention is designed to overcome these difficulties and to produce a perfectly-accurate long and antifriction bearing complete in itself.

Having thus described my invention, I claim as new and desire to secure by Letters Patent—

A roller-bearing cage consisting of a cylinder the parallel bars 6 6 of which are oppositely concaved and are connected at one end by the solid portion 7, integral with said bars, and at the other end by the perforated flange 8, of a diameter greater than the diameter through the barred portion, forming an integral part thereof, the antifriction-rolls 9 9, journaled between the concaved surfaces of the bars, and the ring 10, adapted to secure said rolls in place, as described.

FRANK MOSSBERG.

Witnesses:
J. A. MILLER, Jr.,
M. F. BLIGH.